US009230320B2

(12) United States Patent
El-Baz et al.

(10) Patent No.: US 9,230,320 B2
(45) Date of Patent: *Jan. 5, 2016

(54) COMPUTER AIDED DIAGNOSTIC SYSTEM INCORPORATING SHAPE ANALYSIS FOR DIAGNOSING MALIGNANT LUNG NODULES

(71) Applicant: University of Louisville Research Foundation, Inc., Louisville, KY (US)

(72) Inventors: Ayman S. El-Baz, Louisville, KY (US); Matthew Nitzken, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/833,333

(22) Filed: Mar. 15, 2013

(65) Prior Publication Data

US 2013/0259345 A1 Oct. 3, 2013

Related U.S. Application Data

(60) Provisional application No. 61/617,865, filed on Mar. 30, 2012.

(51) Int. Cl.
G06T 7/00 (2006.01)

(52) U.S. Cl.
CPC ..... *G06T 7/0012* (2013.01); *G06T 2207/10081* (2013.01); *G06T 2207/20081* (2013.01); *G06T 2207/30064* (2013.01)

(58) Field of Classification Search
None
See application file for complete search history.

(56) References Cited

U.S. PATENT DOCUMENTS

| | | | |
|---|---|---|---|
| 6,282,307 B1 * | 8/2001 | Armato et al. | 382/132 |
| 6,549,646 B1 * | 4/2003 | Yeh et al. | 382/132 |
| 7,221,787 B2 * | 5/2007 | Luo et al. | 382/132 |
| 2003/0097219 A1 * | 5/2003 | O'Donnell et al. | 702/19 |
| 2008/0143719 A1 * | 6/2008 | Zhou et al. | 345/426 |
| 2010/0179782 A1 * | 7/2010 | Kimura et al. | 702/94 |
| 2011/0044524 A1 * | 2/2011 | Wang et al. | 382/131 |
| 2011/0142316 A1 * | 6/2011 | Wang et al. | 382/131 |
| 2011/0160546 A1 * | 6/2011 | Madsen | 600/300 |

* cited by examiner

*Primary Examiner* — Tsung-Yin Tsai
(74) *Attorney, Agent, or Firm* — Wood, Herron & Evans, LLP

(57) ABSTRACT

A computer aided diagnostic system and automated method diagnose lung cancer through modeling and analyzing the shape of pulmonary nodules. A model used in such analysis describes the shape of pulmonary nodules in terms of spherical harmonics required to delineate a unit sphere corresponding to the pulmonary nodule to a model of the pulmonary nodule.

20 Claims, 13 Drawing Sheets

COMPUTER AIDED DIAGNOSTIC SYSTEM INCORPORATING SHAPE ANALYSIS FOR DIAGNOSING MALIGNANT LUNG NODULES

CROSS-REFERENCE TO RELATED APPLICATIONS

This application claims the benefit of U.S. Provisional Application No. 61/617,865, filed on Mar. 30, 2012 by Ayman S. El-Baz et al., the entire disclosure of which is incorporated by reference herein.

FIELD OF THE INVENTION

The invention is generally related to computer analysis of medical image data, and in particular to the detection of malignant lung nodules in medial image data, e.g., low dose computed tomography (LDCT) chest scans.

BACKGROUND OF THE INVENTION

Lung cancer remains the leading cause of mortality cancer. In 1999, there were approximately 170,000 new cases of lung cancer in the U.S., where approximately one in every eighteen women and approximately one in every twelve men develop lung cancer. Lung tumors (visible on chest film as pulmonary nodules) are the most common manifestation of lung cancer being the principal cause of cancer-related deaths. A pulmonary nodule is an approximately spherical volume of higher density tissue being visible in an X-ray lung image, and early detection of pulmonary nodules may increase the patient's chance of survival. Detecting pulmonary nodules, however, is a complicated task. Nodules typically show up in an X-ray lung image as relatively low-contrast white circular objects within the lung fields. The difficulty for computer aided image data search schemes is distinguishing true nodules from (overlapping) shadows, vessels and ribs.

The early stage detection of lung cancer therefore remains an important goal in medical research. Regular chest radiography and sputum examination programs have proven ineffective in reducing mortality rates. Although screening for lung cancer with chest X-rays can detect early lung cancer, such screening can also possibly produce many false-positive test results, causing needless extra tests. Furthermore, while large (e.g., greater than 1 cm in diameter) malignant nodules are often relatively easy to detect with conventional screening equipment and can be diagnosed with needle biopsy or bronchoscopy techniques, these techniques are typically unsuitable for detecting smaller nodules, particularly if such nodules are located deep in the lung tissue or away from large airways. In cases involving small nodules, conventional methods rely on analyzing the growth rate of the nodule over time. As may be imagined, waiting a period of time to determine whether a lung nodule is malignant provides a possibly malignant nodule time to grow and become a larger health risk. Hence, while it is preferable to detect lung cancer as early as possible, many conventional methods for detecting lung cancer require waiting periods. Thus, many of these techniques have been found to be unsuitable for early stage lung cancer detection.

At present, low-dose spiral computed tomography (LDCT) is of prime interest for screening (high risk) groups for early detection of lung cancer and is being studied by various groups, including the National Cancer Institute. LDCT provides chest scans with very high spatial, temporal, and contrast resolution of anatomic structures and is able to gather a complete 3D volume of a human thorax in a single breathhold. Hence, for these reasons, in recent years most lung cancer screening programs are being investigated in the United States and Japan with LDCT as the screening modality of choice.

Automatic screening of image data from LDCT typically involves selecting initial candidate lung abnormalities (pulmonary nodules). Next, the false candidates, called false positive nodules (FPNs), are partially eliminated while preserving the true positive nodules (TPNs).

When selecting initial candidates, conformal nodule filtering or unsharp masking can enhance nodules and suppress other structures to separate the candidates from the background by simple thresholding or multiple gray-level thresholding techniques. A series of 3D cylindrical and spherical filters may be used to detect small lung nodules from high resolution CT images. Circular and semicircular nodule candidates may be detected by template matching. However, these spherical, cylindrical, or circular assumptions are typically not adequate for describing the general geometry of the lesions. This is because their shape can be irregular due to the speculation or the attachments to the pleural surface (i.e., juxtapleural and peripheral) and vessels (i.e., vascularized). Morphological operators may be used to detect lung nodules. The drawbacks to these approaches are the difficulties in detecting lung wall nodules. Also, there are other pattern recognition techniques used in detection of lung nodules such as clustering, linear discriminant functions, rule-based classification, Hough transforms, connected component analysis of thresholded CT slices, gray level distance transforms, and patient-specific a priori models.

FPNs may be excluded by feature extraction and classification. Such features as circularity, size, contrast, or local curvature that are extracted by morphological techniques, or artificial neural networks (ANN), may be used as post-classifiers. Also, there are a number of classification techniques used in the final stage of some nodule detection systems to reduce the FPNs such as: rule-based or linear classifiers; template matching; nearest cluster; and Markov random field.

One of the most popular and promising directions of detecting small cancerous nodules is to analyze their changes over time. For example, attempts have been made to classify nodules as benign or malignant by estimating their growth rate. Tracking temporal nodule behavior is a challenging task, however, because of changes in the patient's position at each data acquisition, as well as effects of heart beats and respiration. In order to accurately measure how the nodules are developing in time, all of these motions need to be compensated by registering the LDCT data sets taken at different times. Several methods have been proposed for solving medical image registration problems and excluding the lung motions; however, the accuracy of nodule classification based on the growth rate still remains below clinical requirements.

Therefore, a need continues to exist in the art for improved image processing techniques for use in diagnosing malignant pulmonary nodules.

SUMMARY OF THE INVENTION

The invention addresses these and other problems associated with the prior art by providing a computer aided diagnostic system and automated method for diagnosing lung cancer through modeling and analyzing the shape of pulmonary nodules. A three dimensional (3D) surface mesh model of a pulmonary nodule may be generated based on LDCT data sets. The 3D mesh model may be delineated by spherical harmonic analysis, including representing the 3D mesh surface model of the lung nodule model by a unit sphere with a linear combination of spherical harmonic basis functions. Determining whether the detected lung nodule is benign or malignant may be based at least in part on the number of spherical harmonics (SHs) used to delineate the unit sphere to the 3D surface mesh model of the lung nodule. Embodiments consistent with the invention may utilize a model that describes the shape of pulmonary nodules in terms of the number of SHs used to delineate a unit sphere corresponding to the lung nodule.

Consistent with one aspect of the invention, therefore, a method of classifying a pulmonary nodule includes receiving image data associated with a chest scan; segmenting image data associated with lung tissue from the image data associated with the chest scan; equalizing the segmented image data; segmenting image data associated with a pulmonary nodule from the equalized and segmented image data; modeling the segmented image data to generate a 3D mesh model of a pulmonary nodule; mapping the 3D mesh model to a unit sphere; computing the SHs needed to delineate the unit sphere to the 3D mesh model; and classifying the pulmonary nodule as benign or malignant based at least in part on the computed SHs needed to delineate the unit sphere and a learned shape model based on the classification of a plurality of known pulmonary nodules.

Consistent with another aspect of the invention, an anatomical structure may be classified by processing image data including image data associated with an anatomical structure to generate segmented image data for the anatomical structure; generating a three dimensional (3D) model of the anatomical structure based on the segmented image data; performing shape analysis of the three dimensional model; and classifying the anatomical structure based on the shape analysis of the three dimensional model.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 2A is an exemplary LDCT image, while

FIGS. 8A, 8E and 8I illustrate original LDCT images taken in axial, sagittal and coronal planes, FIGS. 8B, 8F and 8J illustrate nodule segmentation performed on the images of FIGS. 8A, 8E and 8I, FIGS. 8C, 8G and 8K illustrate segmentation of a lung nodule of the images of FIGS. 8B, 8F and 8J, and FIGS. 8D, 8H and 8L illustrate a Radiologist's segmentation of a lung nodule.

DETAILED DESCRIPTION

Embodiments consistent with the invention provide for automated diagnosis of lung cancer principally through characterizing pulmonary nodules through modeling and analyzing their shape, and typically without requiring image registration. The shape is described in terms of a unit sphere corresponding to a 3D mesh model of a pulmonary nodule delineated using a computed number of spherical harmonics (SHs) linearly combined as basis functions. Further details regarding the techniques described herein are provided in A. El-Baz, E. Vanbogaert, G. Gimel'farb, R. Falk, M El-Ghar "3D Shape Analysis for Early Assessment of Detected Lung Nodules," Proc. Of the 14th International Conference on Medical Image Computing and Computer-Assisted Intervention, vol. III, Toronto, Calif., Sep. 18-22, 2011, pp. 175-182, which is incorporated by reference in its entirety.

Figure 1:
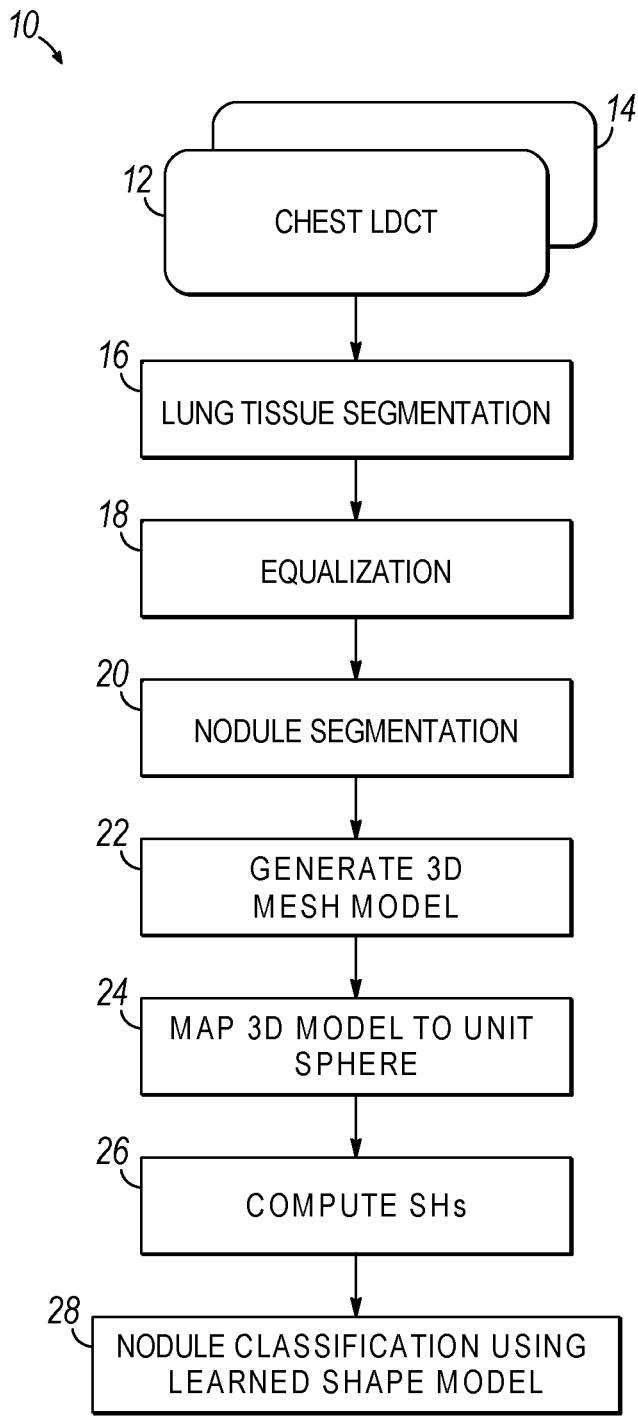
FIG. 1 is a flowchart of an automated lung cancer diagnostic process consistent with the invention.

Now turning to the Drawings, wherein like numbers denote like parts throughout the several views, FIG. 1 illustrates an exemplary automated process 10 for a 3D mesh model shape-based diagnosis of lung cancer consistent with the invention. Process 10 in particular is based upon the determination of whether a pulmonary nodule is malignant or benign via the analysis of a 3D mesh model of the pulmonary nodule and application of a learned model based on a plurality of classified pulmonary nodules. Process 10 receives as input one or more LDCT chest scans 12, 14, and begins by segmenting lung tissues from the LDCT chest scans (block 16). A chest scan, within the context of the invention, typically includes one or more two dimensional "slices" of image data generated from a medical imaging device such as a CT scanner, an MRI imager, or other medical imaging device.

Figure 2A:
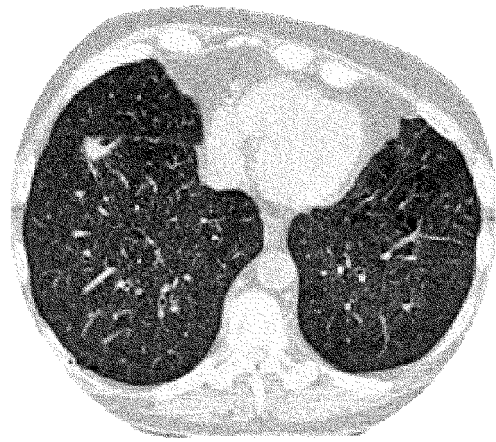
Figure 2B:
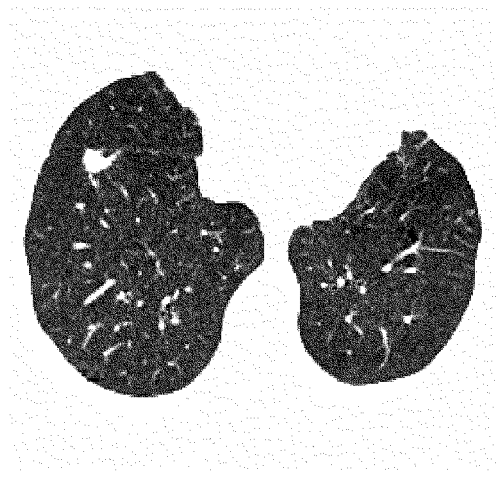
FIGS. 2B-2I illustrate various operations performed on such image by the process of FIG. 1.

In particular, referring also to FIGS. 2A-2B, lung segmentation, equalization and nodule segmentation, may be performed as disclosed in A. El-Baz, G. Gimel'farb, R. Falk, M. Abou El-Ghar, Holland, and T. Shaffer, "A New Stochastic Framework for Accurate Lung Segmentation," Proc. of International Conference on Medical Image Computing and Computer-Assisted Intervention, New York, USA, Sep. 6-10, 2008, pp. 322-330, may be performed on an LDCT slice (FIG. 2A) to form segmented lung image data (FIG. 2B).

Figure 2C:
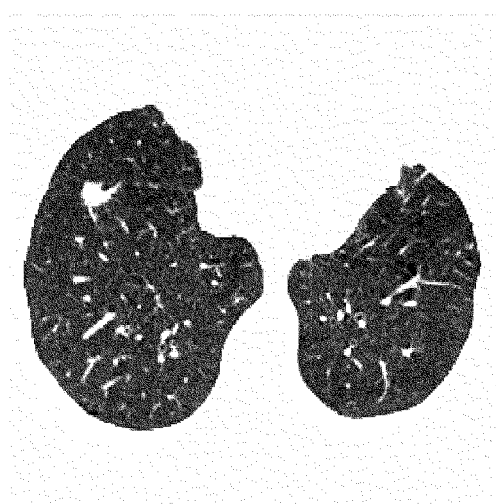

Returning to FIG. 1, once the lung tissue is segmented, the segmented lung image data may be equalized in line width (block 18), e.g., as disclosed in R. Gonzalez and R. Woods, Digital Image Processing, Addison-Wesley Publishing Company (New York), 1992, to form equalized lung image data 14. The equalization of the segmented image data in FIG. 2B, for example, is illustrated in FIG. 2C.

Figure 2D:
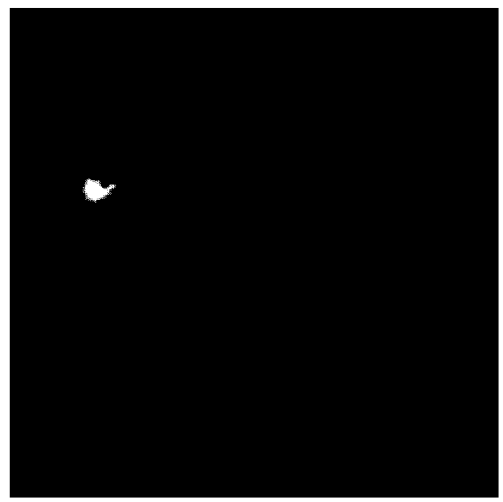

Returning again to FIG. 1, thereafter nodule segmentation may be performed (block 20), e.g., as disclosed in A. Farag, A. El-Baz, G. Gimel'farb, R. Falk, M. Abou El-Ghar, T. El-Diasty, and S. Elshazly, "Appearance Models for Robust Segmentation of Pulmonary Nodules in 3D LDCT Chest Images," Proc. of International Conference on Medical Image Computing and Computer-Assisted Intervention, Copenhagen, Denmark, Oct. 16, 2006, vol. 1, pp. 662-670, thereby segmenting the pulmonary nodule from the equalized lung image data to generate pulmonary nodule image data, as illustrated in FIG. 2D.

Additional details regarding the techniques related to lung tissue segmentation, lung tissue equalization, and nodule segmentation described herein are provided in A. El-Baz, G. Gimel'farb, R. Falk, M El-Ghar "Appearance Analysis for Diagnosing Malignant Lung Nodules," Proc. Of the 2010 IEEE International Conference on Biomedical Imaging: from Nano to Macro, Rotterdam, N L, Apr. 14-17, 2010, pp. 193-196, which is incorporated by reference in its entirety.

Figure 2E:
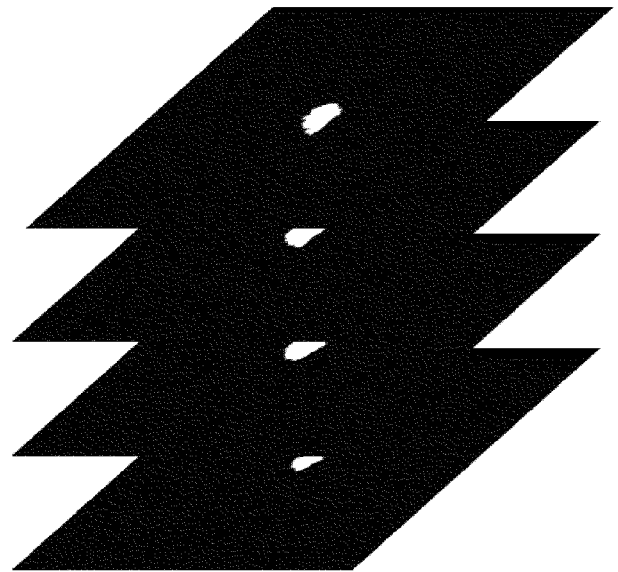
Figure 2F:
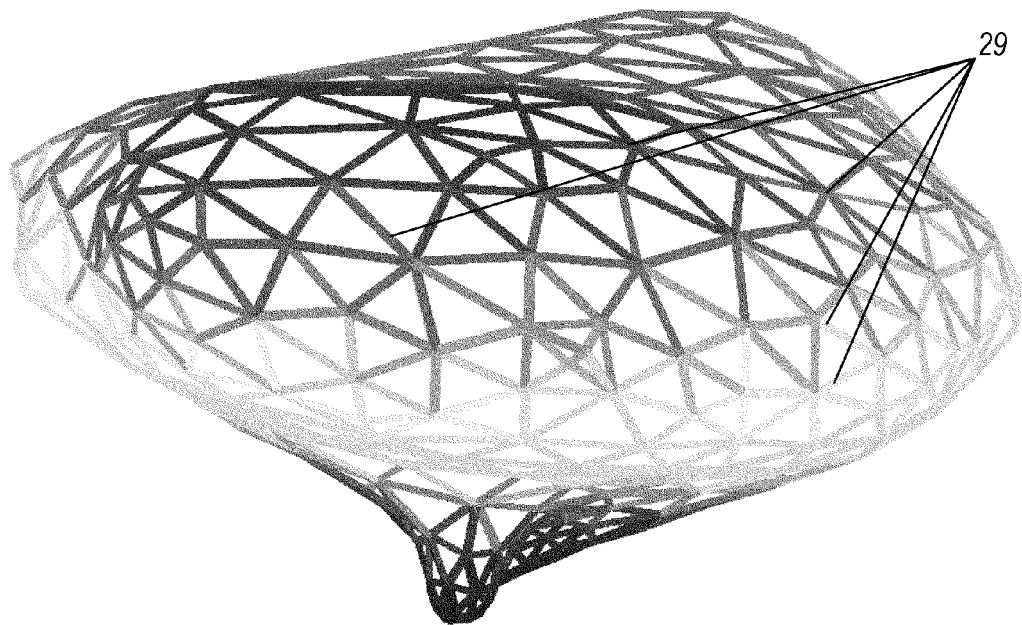

Returning yet again to FIG. 1, once a nodule has been segmented, a three dimensional (3D) mesh model for the lung nodule surface may be generated from a successive stack of two dimensional LDCT segmented slices of a lung nodule (block 22). FIG. 2E provides an exemplary stack of segmented two dimensional LDCT segmented slices of lung nodules, and FIG. 2F provides an exemplary 3D mesh model including a plurality of mesh points of the lung nodule generated from the successive stack of two dimensional LDCT segmented slices of FIG. 2E. A detailed discussion of the generation of the three dimensional mesh is provided below.

Figure 2G:
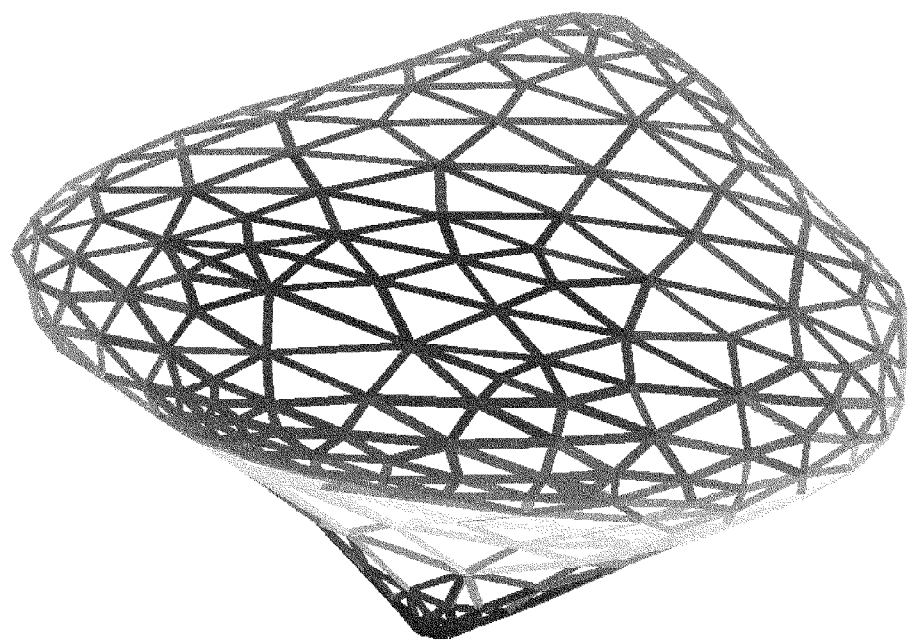
Figure 2H:
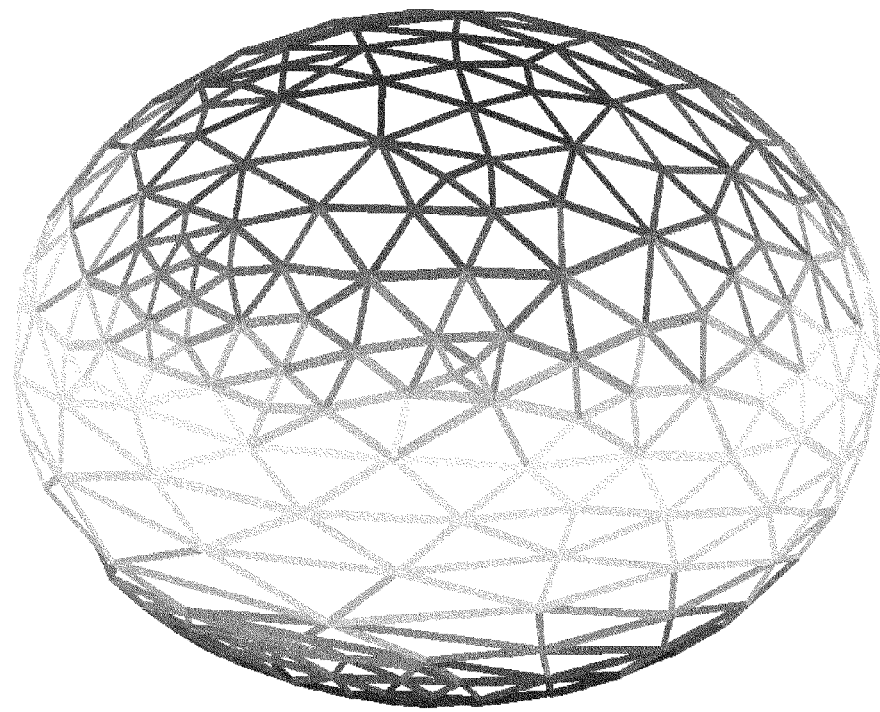
Figure 2I:
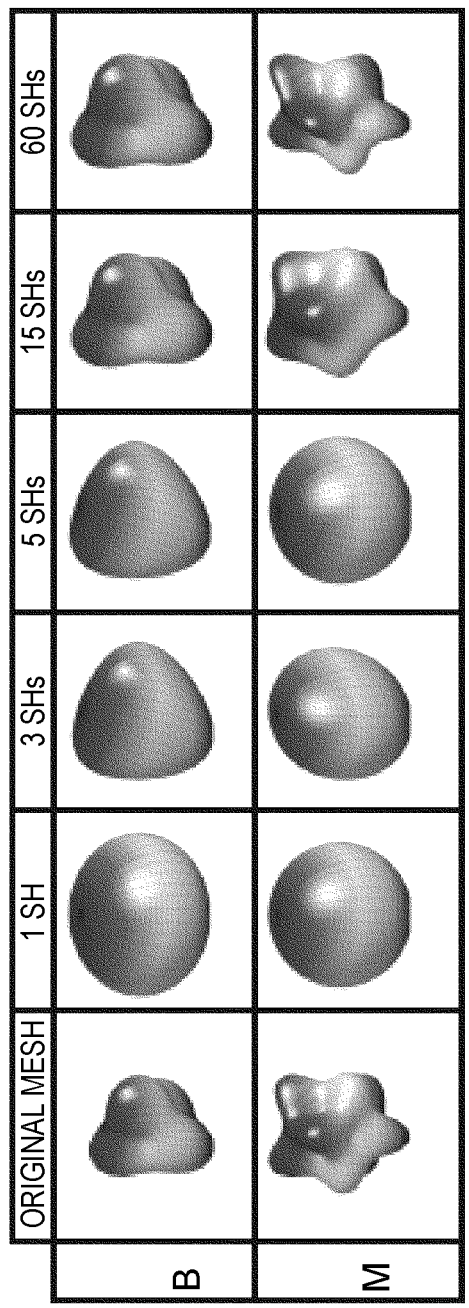

Following generation of the 3D mesh model, the 3D mesh model is mapped to a unit sphere corresponding to the 3D mesh model by smoothing the mesh model and applying mapping rules as provided below (block 24). FIG. 2G provides an exemplary smoothed mesh model of the 3D mesh model of FIG. 2F, and FIG. 2H provides an exemplary unit sphere generated by applying an attraction and repulsion method to the mesh points of the smoothed mesh model of FIG. 2G. After mapping the 3D mesh model to the unit sphere, the number of spherical harmonics needed to delineate the unit sphere to the original 3D mesh model of the lung nodule are computed (block 26). FIG. 2I provides an exemplary illustration of an 3D mesh model for a benign lung nodule and a malignant lung nodule and illustrates a the delineation of a unit sphere corresponding to the 3D mesh model using spherical harmonics, as will be described in detail below. A model based on the analysis of previously classified pulmonary nodules may be applied to determine whether the analyzed pulmonary nodule is benign or malignant based on the number of spherical harmonics combined to delineate the unit sphere to the 3D mesh model (block 28). Generally, a malignant pulmonary nodule requires more spherical harmonics to delineate a corresponding unit sphere as compared to the number of spherical harmonics required to delineate a unit sphere corresponding to a benign nodule. For example, referring to FIG. 2I, the unit sphere corresponding to the benign nodule is substantially delineated to the original 3D mesh model with approximately 15 SHs, while the unit sphere corresponding to the malignant nodule is substantially delineated to the original 3D mesh model with 60 SHs.

Figure 3:
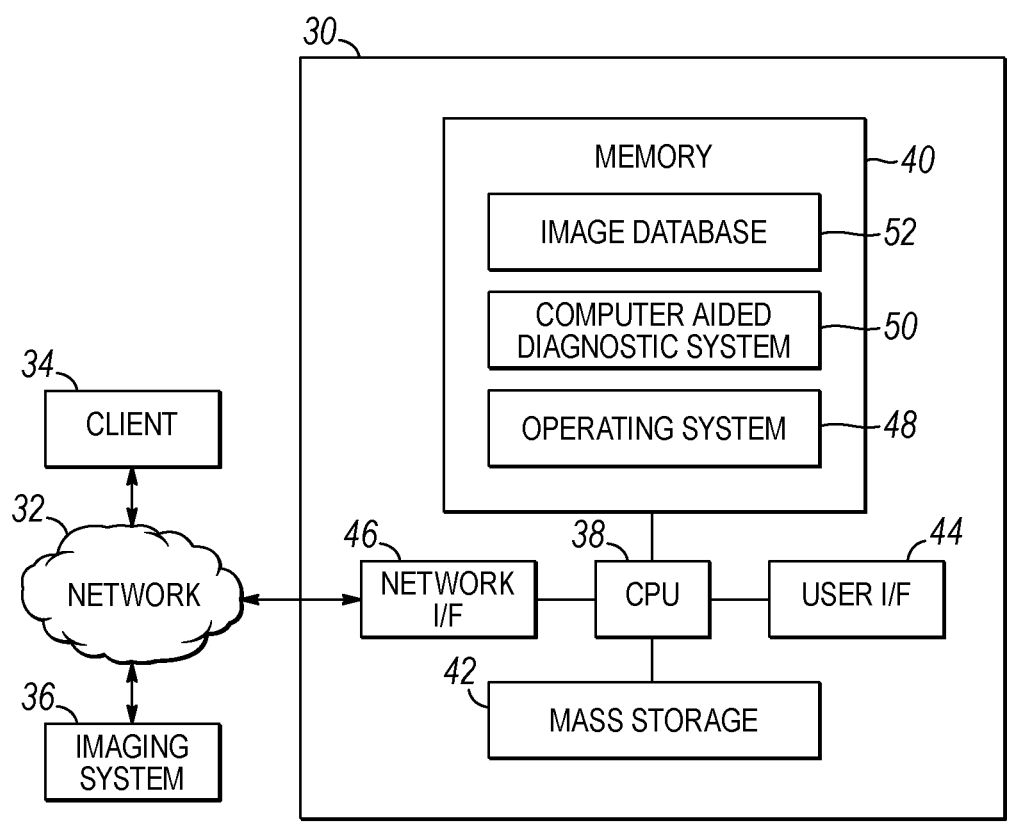
FIG. 3 is a block diagram of an exemplary apparatus suitable for implementing steps from the process of FIG. 1.

One or more steps in process 10 may be implemented in an automated fashion, utilizing a computer or other electronic device to implement such steps. FIG. 3, for example, illustrates an exemplary apparatus 30 within which various steps from process 10 may be implemented in a manner consistent with the invention. Apparatus 30 in the illustrated embodiment is implemented as a server or multi-user computer that is coupled via a network 32 to one or more client computers 34, as well as an imaging system 36, e.g., a helical or multi-slice LDCT scanner. For the purposes of the invention, each computer 30, 34 may represent practically any type of computer, computer system or other programmable electronic device. Moreover, each computer 30, 34 may be implemented using one or more networked computers, e.g., in a cluster or other distributed computing system. In the alternative, computer 30 may be implemented within a single computer or other programmable electronic device, e.g., a desktop computer, a laptop computer, a handheld computer, a cell phone, a set top box, etc.

Computer 30 typically includes a central processing unit 38 including at least one microprocessor coupled to a memory 40, which may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 40 may be considered to include memory storage physically located elsewhere in computer 30, e.g., any cache memory in a processor in CPU 38, as well as any storage capacity used as a virtual memory, e.g., as stored on a mass storage device 42 or on another computer coupled to computer 30. Computer 30 also typically receives a number of inputs and outputs for communicating information externally. For interface with a user or operator, computer 30 typically includes a user interface 44 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 30 may also include one or more mass storage devices 42, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface 46 with one or more networks 32 (e.g., a LAN, a WAN, a wireless network, and/or the Internet, among others) to permit the communication of information with other computers and electronic devices. It should be appreciated that computer 30 typically includes suitable analog and/or digital interfaces between CPU 36 and each of components 40, 42, 44 and 46 as is well known in the art. Other hardware environments are contemplated within the context of the invention.

Computer 30 operates under the control of an operating system 48 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to computer 30 via network 32, e.g., in a distributed or client-server computing environment, whereby the processing required to implement the functions of a computer program may be allocated to multiple computers over a network.

As an example, computer 30 may include a computer aided diagnostic (CAD) system program 50 used to implement one or more of the steps described above in connection with process 10. For the purposes of implementing such steps, an image database 52, storing LDCT chest scan images, may be implemented in computer 30. It will be appreciated, however, that some steps in process 10 may be performed manually and with or without the use of computer 30.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable storage media include but are not limited to physical, tangible storage media such as volatile and non-volatile memory devices, floppy and other removable disks, hard disk drives, magnetic tape, optical disks (e.g., CD-ROMs, DVDs, etc.), among others.

In addition, various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Lung Nodule Segmentation

Accurate lung nodule segmentation from 3D LDCT scans is a challenging problem because the intensities of the lung nodules and surrounding tissues (e.g., blood vessels, chest, etc.) are not clearly distinguishable. Embodiments of the invention may segment a lung nodule based at least in part on the methodology described in the aforementioned article "Appearance models for robust segmentation of pulmonary nodules in 3D LDCT chest images," which describes using a conventional 3D parametric deformable boundary one or more pulmonary nodules may be segmented from surrounding tissues. However, the evolution of a lung nodule is controlled with two probabilistic visual appearance models, namely, a learned lung nodule appearance prior and a current appearance model of the image to be segmented.

The learned lung nodule appearance prior model is a 3D Markov-Gibbs random field (MGRF) model of the lung nodules' intensities with translation- and rotation-invariant pair-wise voxel interaction, being learned analytically based on developing a new maximum likelihood estimator from training data. The current appearance is modeled by a mixed marginal distribution of the voxel intensities in both the lung nodule and surrounding tissues. To extract the voxel-wise model of the current nodule appearance, the mixture is precisely approximated with a linear combination of discrete Gaussians (LCDG) (as introduced in A. El-Baz and G. Gimel'farb, "EM Based Approximation of Empirical Distributions with Linear Combinations of Discrete Gaussians," Proc. of IEEE International Conference on Image Processing (ICIP'07), San Antonio, Tex., USA, Sep. 16-19, 2007, vol. IV, pp. 373-376) and automatically separated into the lung nodule and background LCDG models. Let (x,y,z) be Cartesian 3D point coordinates. A conventional parametric deformable surface, B $(P_1, \ldots P_k)$, specified by K control vertices $P_k=(x_k,$ $y_k, z_k)$, evolves in the directions that minimize its energy, E, depending on internal, $\xi_{int}(B)$, and external, $\xi_{ext}(B)$, forces (as introduced in M. Kass, A. Witkin, D. Terzopoulos, "Snakes: Active contour models," Int. J. Computer Vision 1, 321-331 (1987)):

$$E = E_{int} + E_{ext} = \int_B (\zeta_{int}(B) + \zeta_{ext}(B))dB \quad (1)$$

Consistent with the invention, a type of external energy that depends on both the learned prior and the current (on-going) appearance model is utilized. Accordingly, $Q=\{0, \ldots, Q-1\}$ and $L=\{nl; bg\}$ where Q and L are finite sets of image intensities (gray values) and region labels, respectively. To reduce the impact of global contrast and offset deviations of intensities due to different sensors, each input 3D image is normalized by mapping its signal range $[q_{min}; q_{max}]$ to the maximal range of $[0, 255]$. Furthermore, a finite 3D arithmetic lattice $R=[(x, y, z): x=0, \ldots, X-1; y=0, \ldots, Y-1; Z-1, \ldots, Z-1]$ support a 3D image g: $R \rightarrow Q$ and its region map m:$R \rightarrow L$. The label, $m_{x,y,z}$, associates the voxel, $g_{x,y,z}$, with the lung nodule or the background.

To consider the normalized images as samples of a prior MGRF model but exclude any image alignment before the segmentation, a generic translation and rotation-invariant MGRF with only voxel-wise and central symmetric pair-wise voxel interaction may be used. The central-symmetric voxel interaction is defined by a set of N characteristic central symmetric voxel neighborhoods $\{n_v = (v \in N)\}$ on R and a corresponding set V of Gibbs potentials, one per neighborhood. A central-symmetric neighborhood $n_v$ embraces all voxel pairs such that the coordinate offsets between any voxel (x, y, z) and its neighbor (x', y', z') belong to an indexed semi-open interval $[d_{v,min}, d_{v,max})$; $v \in N \subset \{1, 2, 3, \ldots\}$ of the inter-voxel distances:

$$d_{v,min} \leq \sqrt{(x-x')^2 + (y-y')^2 + (z-z')^2} < d_{v,max}.$$

In order to learn the appearance prior model, a training set $S = \{(g_t, m_t): t=1, \ldots, T\}$ with known region maps is used. Furthermore, a portion of a region R, $R_t = \{(x, y, z): (x, y, z) \in R \wedge m_{t;xyz} = nl\}$ supports the lung nodule in the t-th training part $(g_t, m_t)$; $t=1 \ldots, T$. $C_{v,t}$ is a family of voxel pairs in $R_t^2$ with the coordinate offset $(\xi, \eta, \tau) \in n_v$ for a particular neighborhood. An empirical marginal probability distribution of voxel intensity, $F_{vx,t}$, and of intensity co-occurrences $F_{v,t}$ in the training lung nodule from $g_t$:

$$F_{vx,t} = \left[ f_{vx,t}(q) = \frac{|R_{t,q}|}{|R_t|}: q \in Q \right]$$

and $$F_{v,t} = \left[ f_{v,t}(q, q') = \frac{|C_{v,t;q,q'}|}{|C_{v,t}|}: (q, q') \in Q^2 \right]$$

where $R_{t,q} = \{(x, y, z):(x, y, z) \in R_t \wedge g_{x,y,z}=q\}$ is a subset of voxels supporting the intensity q and $C_{v,t;q,q'}$ is a subset of the voxel pairs $c_{\xi,\eta,\tau}(x, y, z) = ((x, y, z), (x+\xi, y+\eta, z+\tau)) \in R_t^2$ supporting the intensity co-occurrence (q,q') in the training lung nodule from $g_t$. A potential function of voxel intensities $V_{VX} = [V_{VX}(q):q \in Q]$ describes voxel-wise interaction, and a potential function of intensity co-occurrences in the neighboring voxel pairs $V_v = [V_v(q,q'):(q,q') \in Q^2]$ describes the pair-wise interaction in the neighborhood $n_v$. The MGRF model of the t-th training pair is specified by the joint Gibbs probability distribution on the sublattice $R_t$:

$$P_t = \frac{1}{Z_t}\exp\left(|R_t|\left(V_{vx}^T F_{vx,t} + \sum_{v \in N\rho v,t} V_{v,t}^T F_{v,t}\right)\right) \quad (2)$$

where $$\rho_{v,t} = \frac{|C_{v,t}|}{|R_t|}$$

may be considered the average cardinality of $n_v$ with respect to $R_t$.

To identify the MGRF model in Eq. (2), the Gibbs potentials may be determined analytically:

$$V_{vx,nl} = \log f_{vx,nl}(q) - \frac{1}{Q}\sum_{\kappa \in Q}\log f_{vx,nl}(\kappa) \quad (3)$$

for $q \in Q$; and $$V_{vx,nl}(q,q') + \lambda\rho_v(f_{v,nl}(q,q') - f_{vx,nl}(q)f_{vx,nl}(q')) \quad (4)$$

for $(q, q') \in Q^2$ where the common factor $\lambda$ may also be computed analytically.

The current appearance of a pulmonary nodule may be modeled using a linear combination of discrete Gaussians (LCDG), where the marginal distribution of voxel intensities within a boundary of the pulmonary nodule model may be considered a dynamic mixture of two probability models: a first model that characterizes the lung nodule, and a second model that characterizes the lung nodule's background. The dynamic mixture is partitioned into two LCDG models using an EM-based approach introduced in the aforementioned "Em based approximation of empirical distributions with linear combinations of discrete guassians."

Based on the appearance models described above, the evolution of the pulmonary nodule model boundary for the learned prior and on-going nodule appearance model evolves guided by the combined external energy term of Eq. (1), where $p_{vx,nl}(q)$ may be the marginal probability of the intensity q in the estimated current LCDG model for the lung nodule. As such, both the learned prior and the on-going nodule appearance model are guided by:

$$\zeta_{ext}(P=(x,y,z)) = -p_{vx,n1}(g_{x,y,z})\pi_p(g_{x,y,z}|S) \quad (5)$$

In such embodiments, $\pi p(q|S)$ may be considered the prior conditional probability of q, given the fixed current intensities in the characteristic central-symmetric neighborhood of P for the MGRF prior model of Eq. (2), and $Ep(q|S)$ may be considered the conditional Gibbs energy of pair-wise interaction for the voxel P when an intensity q is assigned to the lung nodule while the other current intensities in all its neighboring voxels over the characteristic neighborhoods $n_v$ remains fixed. After the changes in the total energy $E_B$ of the 3D region $R_B \subset R$ inside the evolving boundary B stop, the evolution terminates, where $E_B$ may be defined by:

$$E_B \sum_{\forall P=(x,y,z)\in R_B} E_P(g_{x,y,z}|S) \quad (6)$$

Spherical Harmonic Shape Analysis

In embodiments of the invention, a 3D mesh model may be generated for the surface of a segmented lung nodule. In some embodiments, the surface of the segmented lung nodule may be approximated by a triangulated mesh (see, e.g., FIG. 2F) including a plurality of interconnected nodes (e.g., elements 29 of FIG. 2F). The triangulated 3D mesh may be generated using techniques introduced in Fang, D. Boas, "Tetrahedral mesh generation from volumetric binary and grayscale images," Proceedings of IEEE International Symposium on Biomedical Imaging from Nano to Macro, Boston, Mass., USA, Jun. 28-Jul. 1, 2009, pp. 1142-1145.

Figure 4:
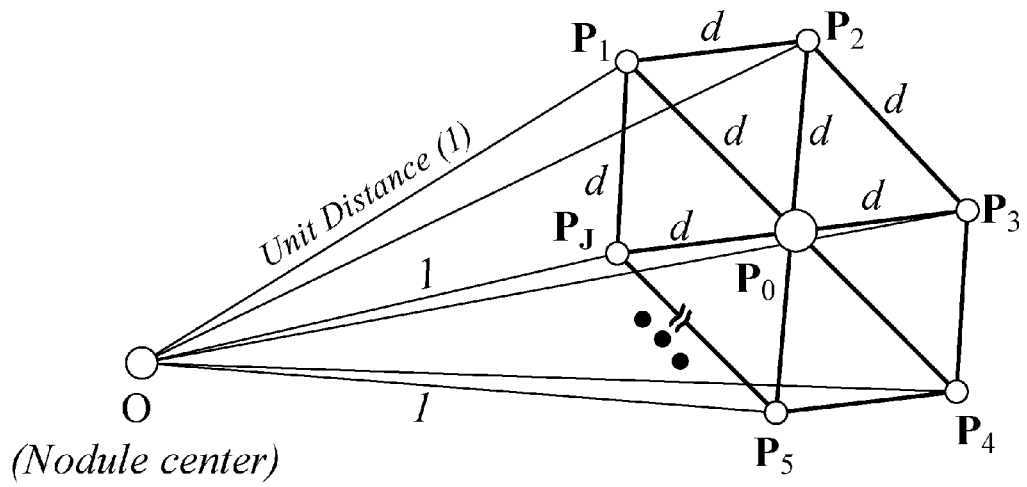
FIG. 4 is an illustration of a plurality of mesh nodes and spacing between such mesh nodes to map a model of a pulmonary nodule to a unit sphere by the process of FIG. 1.
Figure 5:
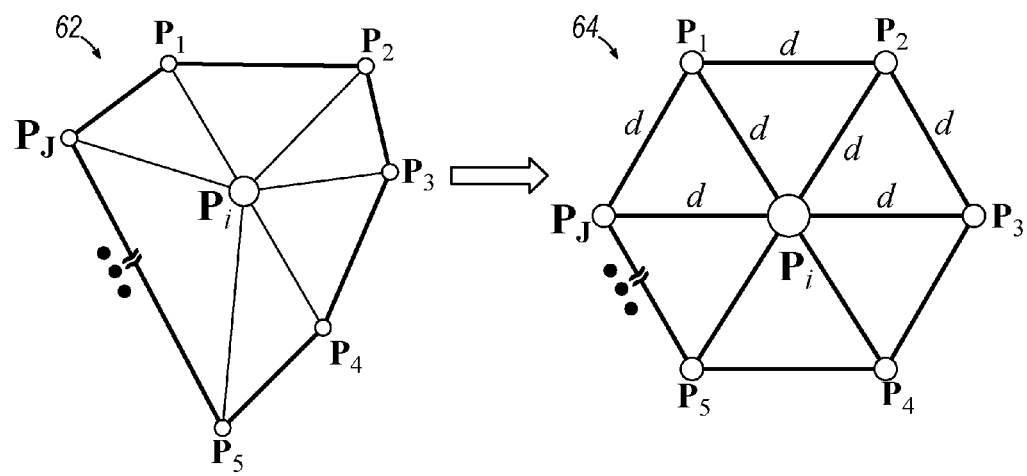
FIG. 5 is an illustration of a plurality of mesh nodes and rearrangement of such nodes that may be performed by the process of FIG. 1.

The surface of the 3D mesh model may be mapped to a corresponding unit sphere (see, e.g., FIG. 2H). In some embodiments of the invention, a 3D mesh model of the lung nodule may be mapped to the unit sphere by modifying the position of the plurality of nodes of the mesh model such that (1) each node is a determined unit distance from the lung nodule center and (2) each node is an equal distance from each neighboring node. FIG. 4 provides an exemplary illustration of nodes $P_{0\text{-}J}$ of a 3D mesh model being positioned such that each node $P_{0\text{-}j}$ is a unit distance T from the center O of the model of the nodule and such that each node $P_{0\text{-}j}$ is an equal distance 'd' from each neighboring node. FIG. 5 provides an exemplary illustration of the rearrangement of the nodes $P_{i\text{-}J}$ from an original mesh configuration 62 to a mesh mapped to a unit sphere 64.

Embodiments of the invention may execute an Attraction-Repulsion algorithm to map a 3D mesh of a lung nodule to a unit sphere, where the Attraction-Repulsion algorithm includes an iteration index T, the total number of mesh nodes may be considered T, and $P_{T,I}$ may be considered the Cartesian coordinates of the surface node i at iteration T; I=1, . . . I. J may be considered the number of neighbors for a mesh node (see, e.g., FIG. 5), where $d_{T,ij}$ defines the Euclidean distance between the mesh nodes I and j at iteration T, where i=1, . . . , I and j=1, . . . , J. Furthermore, $\Delta_{\tau,ji}=P_{\tau,j}-P_{\tau,i}$ may be considered the displacement between the nodes j and I at iteration T. Retraction constants, $C_{A,1}$ and $C_{A,2}$, and a repulsion constant $C_R$ control the displacement of each surface node. The Attraction-Repulsion algorithm iteratively rearranges the nodes of a mesh model to a unit sphere while maintaining the two distances discussed above. First, an attraction step centers each node $P_i$; i=1 . . . , I, with respect to neighboring nodes by iteratively adjusting each node's location, by:

$$P'_{\tau,i} = P_{\tau,i} + C_{A,1}\sum_{j=1;j\neq i}^{J}\Delta_{\tau,ji}d_{\tau,ji}^2 + C_{A,2}\frac{\Delta_{\tau,ji}}{d_{\tau,ji}} \quad (7)$$

The factor $C_{A,2}$ may prevent tightly packed nodes from collision and pushes adjusted nodes away from neighboring nodes if a particular neighboring node is significantly closer than other neighboring nodes.

A repulsion step serves to inflate the mesh by pushing all nodes outward to become evenly spaced after a final back-projection onto the unit sphere along rays from the center of the sphere. To prevent shifting and collisions with altered nodes, the location of each node $P_i$ is updated before the back-projection by utilizing the following equation:

$$P^o_{\tau+1,i} = P'_{\tau,i} + \frac{C_R}{2I} \sum_{j=1; j \neq i}^{I} \left( \frac{\Delta_{\tau,ji}}{|\Delta_{\tau,ji}|^2} \right) \quad (8)$$

A repulsion constant $C_R$ controls the displacement of each node and also balances between processing time and accuracy ((e.g. a smaller $C_R$ values guarantees that the nodes will not become crossed during the iterations at the expense of the increased processing time). For example, in some embodiments, the repulsion constant may be configured between approximately 0.3 and 0.7, although other values may be used depending on accuracy and processing time.

Figure 6:
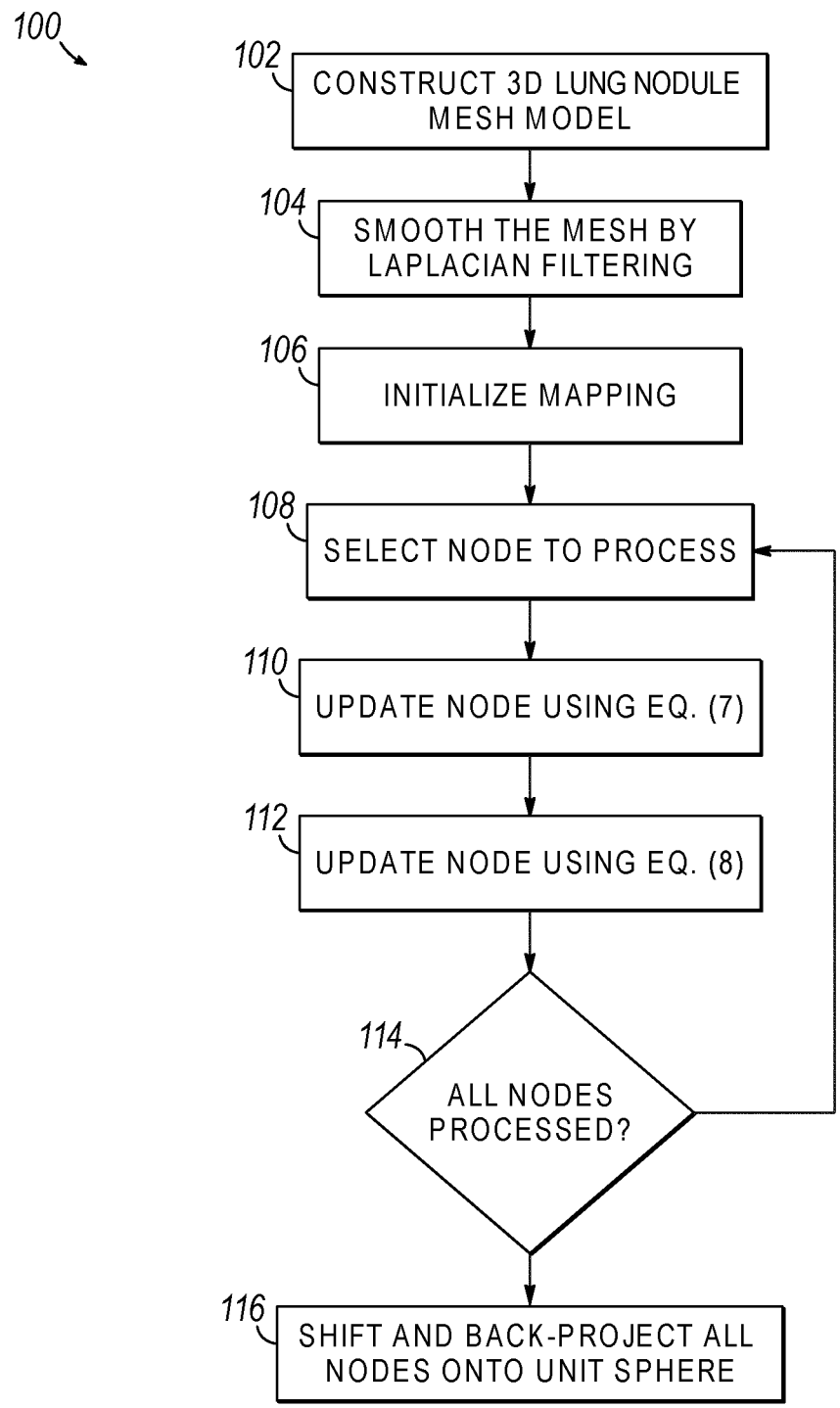
FIG. 6 is a flowchart of a sequence of operations that may be performed to map the 3D mesh model of FIG. 2F to the unit sphere of FIG. 2H.

Embodiments of the invention may generally perform the following steps for the Attraction-Repulsion Algorithm illustrated in the flowchart 100 of FIG. 6. The 3D mesh model may be constructed (block 102) (see, e.g., FIG. 2F) and filtered using Laplacian filtering (block 104) (see, e.g., FIG. 2G). The filtered mesh may be mapped to a corresponding unit sphere by initializing the mapping (block 106) and processing each node of the mesh as shown in blocks 108-114, and the nodes may be shifted and back-projected onto the corresponding unit sphere (block 116) following the processing in blocks 108-114.

In particular, in block 108, a node is selected to be processed, and in block 110 the node is updated in the manner described above in connection with Eq. (7). In block 112 the node is updated in the manner described above in connection with Eq. (8), and block 114 passes control back to block 108 as long as additional nodes remain to be processed. Once all nodes have been processed, block 114 passes control to block 116 to shift and back-project the nodes onto the corresponding unit sphere.

The original 3D model is approximated by the corresponding unit sphere and a linear combination of spherical harmonics (SHs), where the lower-order harmonics suffice to represent more generic details of the nodule, while the higher order SHs represent finer details. The SHs are generated by solving an isotropic heat equation for the nodule surface on the unit sphere, where S:M→U denotes the mapping of a nodule mesh M to the unit sphere U. Each node $P=(x, y, z) \in M$ mapped to the spherical position $u=S(P)$ may be represented by a spherical coordinate $u=(\sin\theta\cos\phi, \sin\theta\sin\phi, \cos\theta)$ where $\theta \in [0, \pi]$ and $\phi \in [0, 2\pi)$ are the polar and azimuth angles, respectively. A SH of $Y_{\alpha\beta}$ of degree $\alpha$ and order $\beta$ may be defined as introduced in R. Courant, D. Hilbert, *Methods of Mathematical Physics*, vol. II. Interscience, New York (1953):

$$Y_{\alpha\beta} = \begin{cases} c_{\alpha\beta} G_\alpha^{|\beta|} \cos\theta \sin(|\beta|\varphi) & -\alpha \leq \beta \leq -1 \\ \frac{c_{\alpha\beta}}{\sqrt{2}} G_\alpha^{|\beta|} \cos\theta & \beta = 0 \\ c_{\alpha\beta} G_\alpha^{|\beta|} \cos\theta \cos(|\beta|\varphi) & 1 \leq \beta \leq \alpha \end{cases} \quad (9)$$

The associated Legendre polynomial is $$c_{\alpha\beta} = \left( \frac{2a+1}{2\pi} \frac{(a-|\beta|)!}{(a+|\beta|)!} \right)^{\frac{1}{2}}$$

and $G_\alpha^{|\beta|}$ of degree $\alpha$ and order $\beta$. For the fixed $\alpha$, the polynomials $G_\alpha^\beta$ are orthogonal over the range $[-1, 1]$.

The lung nodule may be reconstructed from the SHs determined in Eq. (9). An iterative technique introduced in L. Shen, M. K. Chung, "Large-scale modeling of parametric surfaces using spherical harmonics," Proc. 3rd International Symposium 3D Data Processing, Chapel Hill, N.C., Jun. 14-16, 2006, pp. 294-301, in the reconstruction of the lung nodule. As shown in FIG. 2I, the model accuracy does not significantly change for a benign nodule from 15 to 60 SHs, while the model accuracy continues to increase for the malignant nodule from 15 to 60 SHs.

Figure 7:
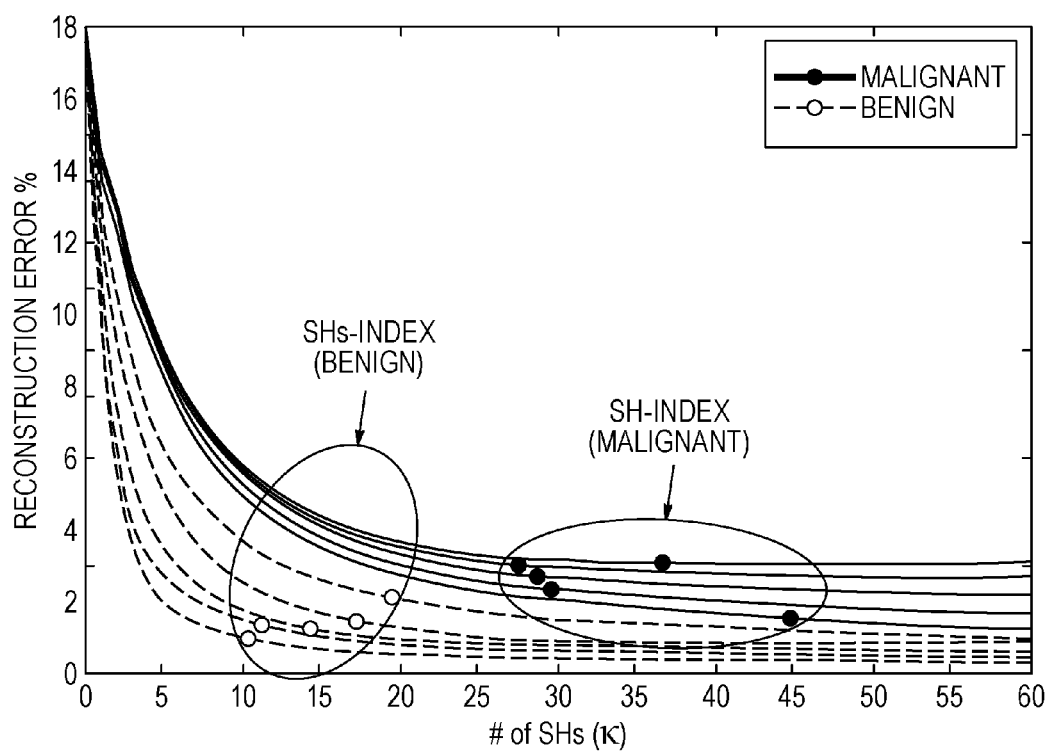
FIG. 7 is a graph illustrating steps in the calculation the number of spherical harmonics used to delineate the unit sphere of FIG. 2H to the 3D mesh model of FIG. 2F.

Therefore, embodiments of the invention may classify a pulmonary nodule based at least in part on the shape of the pulmonary nodule, where the shape may be described in terms of the number of SHs needed to delineate a corresponding unit sphere to the original mesh model. Therefore, the number of the SHs after which there are no significant changes in the approximations can be used as a new shape index quantifying the shape complexity of the detected lung nodules. Due to the unit sphere mapping, the original mesh for each nodule is inherently aligned with the mesh for the approximate shape, and the sum of the Euclidean distances between the corresponding nodes gives the total error between both the mesh models. As shown in FIG. 7, the total error curves for the increasing number K of the SHs can be statistically analyzed to differentiate between the malignant and benign nodules.

Furthermore, embodiments of the invention may consider other factors in classifying a pulmonary nodule, including the area under the error curve shown in FIG. 7 for a pulmonary nodule and/or the relationship between nodes on the 3D mesh and whether such transition is rough or smooth as introduced in the aforementioned article "Appearance Analysis for Diagnosing Malignant Lung Nodules." Hence, embodiments of the invention may determine whether a lung nodule is malignant or benign based on a plurality of factors, where each factor may be considered a coordinate for a three dimensional space (e.g., (x,y,z)=(number of SHs, area under error curve, Gibbs Energy)) where a model based on previously classified lung nodules may comprise a three dimensional space including three dimensional coordinates for each previously classified nodule. A lung nodule may be determined to be malignant or benign based at least in part on the distance between the three dimensional coordinate of the lung nodule and an average coordinate for a benign lung nodule and a malignant lung nodule, where the average coordinates for each type of lung nodule may be based on the values determined for previously classified lung nodules. Hence, in these embodiments, a lung nodule may be determined to be benign if the determined three dimensional coordinate is closer in distance to the average benign three dimensional coordinate. Similarly, the lung nodule may be determined to be malignant if the determined three dimensional coordinate is closer in distance to the average malignant three dimensional coordinate. Furthermore, a probability may be associated with the classification of the lung nodule according to the following equation:

$$\text{Probability} = 1 - \frac{d_1}{d_1 + d_2}$$

The first distance $d_1$ corresponds to the smallest distance between the three dimensional coordinate of the lung nodule and the average malignant or benign coordinate, and the second distance $d_2$ corresponds to the largest distance between the three dimensional coordinate of the lung nodule and the average malignant or benign coordinate. While this exemplary embodiment includes 3 variables (i.e., number of SHs, area under the error curve, Gibbs Energy), the use of more or less variables are within the scope of the invention. For example, a fourth variable may comprise a calculated growth rate over a period of time and/or other such variables associated with classifying a pulmonary lung nodule as malignant or benign.

Working Example

To justify the proposed methodology of analyzing the 3D shape of both malignant and benign nodules, the above proposed shape analysis framework was pilot-tested on a database of clinical multislice chest LDCT scans of 327 lung nodules (153 malignant and 174 benign). The CT data sets each have $0.7 \times 0.7 \times 2.0$ mm$^3$ voxels, with nodule diameters ranging from 3 mm to 30 mm. Note that these 327 nodules were diagnosed using a biopsy (the ground truth).

Figure 8A:
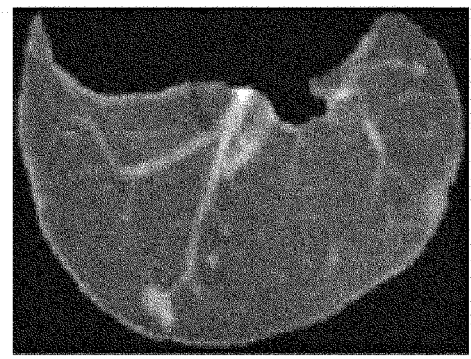
FIGS. 8A-8I illustrate the appearance analysis of malignant nodules, where
Figure 8B:
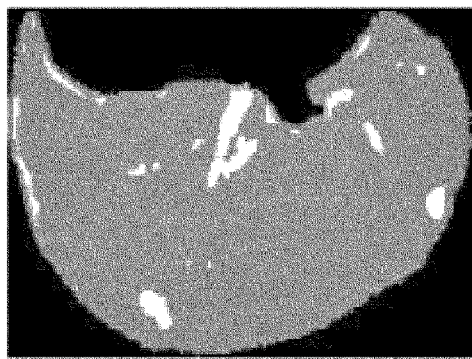
Figure 8C:
Figure 8D:
Figure 8E:
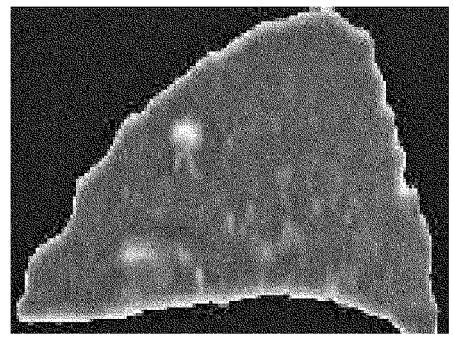
Figure 8F:
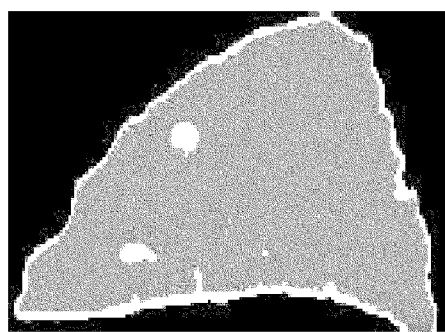
Figure 8G:
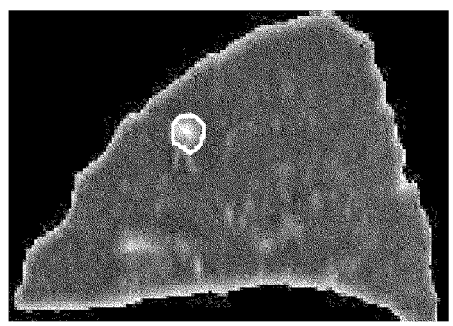
Figure 8H:
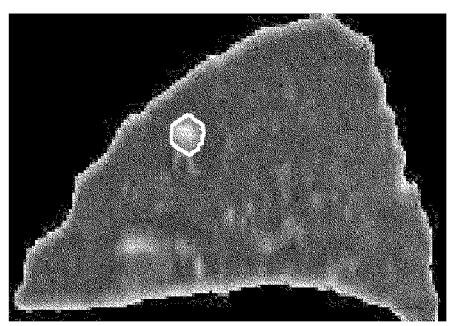
Figure 8I:
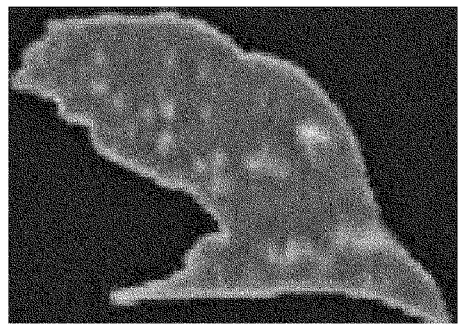
Figure 8J:
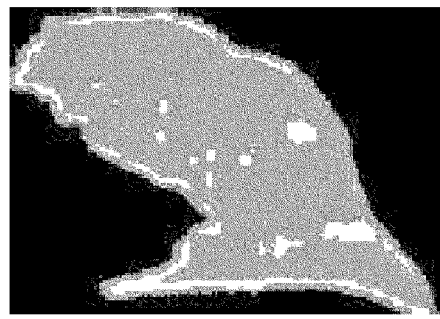
Figure 8K:
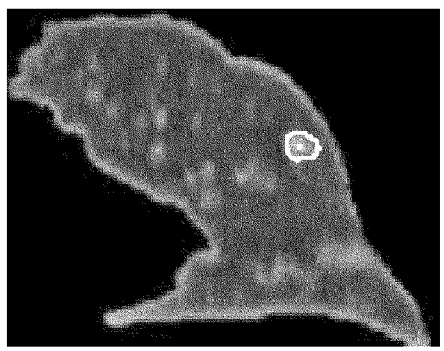
Figure 8L:
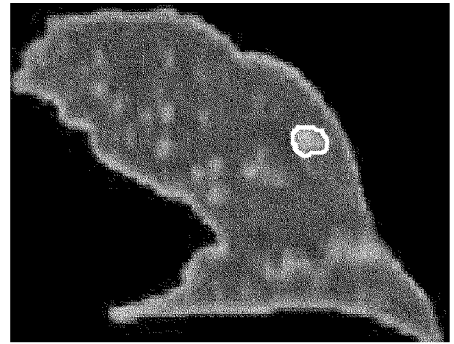

FIGS. 8A-L illustrate results of segmenting pleural attached nodules shown by axial (FIGS. 8A-D), sagittal (FIGS. 8E-H) and coronal (FIGS. 8I-L) cross sections. The pixel wise Gibbs energies in each cross section are higher for the nodules than for any other lung voxels including the attached artery. Therefore, the approach separates accurately the pulmonary nodules from any part of the attached artery. The evolution terminates after 50 iterations because the changes in the total energy become close to zero. The error of segmentation with respect to the radiologist "ground truth" is 1.86%. In total, the segmentation of 327 nodules has an error range of about 0.29%-2.17% with a mean error of 0.71% and a standard deviation of 1.21%. FIGS. 8A, 8E and 8I provide exemplary 2D profiles of an original scan; FIGS. 8B, 8F and 8J provide exemplary pixel-wise Gibbs energies for v less than or equal to 11; FIGS. 8C, 8G, 8K provide exemplary segmentation consistent with embodiments of the invention; and FIGS. 8D, 8H, 8L provide exemplary radiologist's segmentation.

The training subset for classification (15 malignant lung nodules and 15 benign lung nodules) was arbitrarily selected among all of the 327 lung nodules. The accuracy of classification based on using K-nearest classifier with the training and test subjects was evaluated using the $X^2$-test at 95% confidence level. At the 95% confidence level, the classification correctly classified 143 out of 153 malignant nodules (a 93.5% accuracy), and 163 out of 174 control subjects (a 93.7% accuracy). The overall accuracy using the proposed 3D shape-based CAD system for 95% confidence level is 93.6% in the first detection of lung nodules. The classification based on traditional growth rate approach (introduced in A. Reeves, A. Chan, D. Yankelevitz, C. Henschke, B. Kressler, W. Kostis, "On measuring the change in size of pulmonary nodules," IEEE Trans. Med. Imaging, vol. 25, pp. 435-449 (2005)) over one year is 87 out of 153 malignant nodules (a 56.9% accuracy), and 114 out of 174 benign nodules (a 65.7% accuracy) at a 95% confidence level, these results highlight the advantage of the proposed shape-based diagnostic approach.

Figure 9:
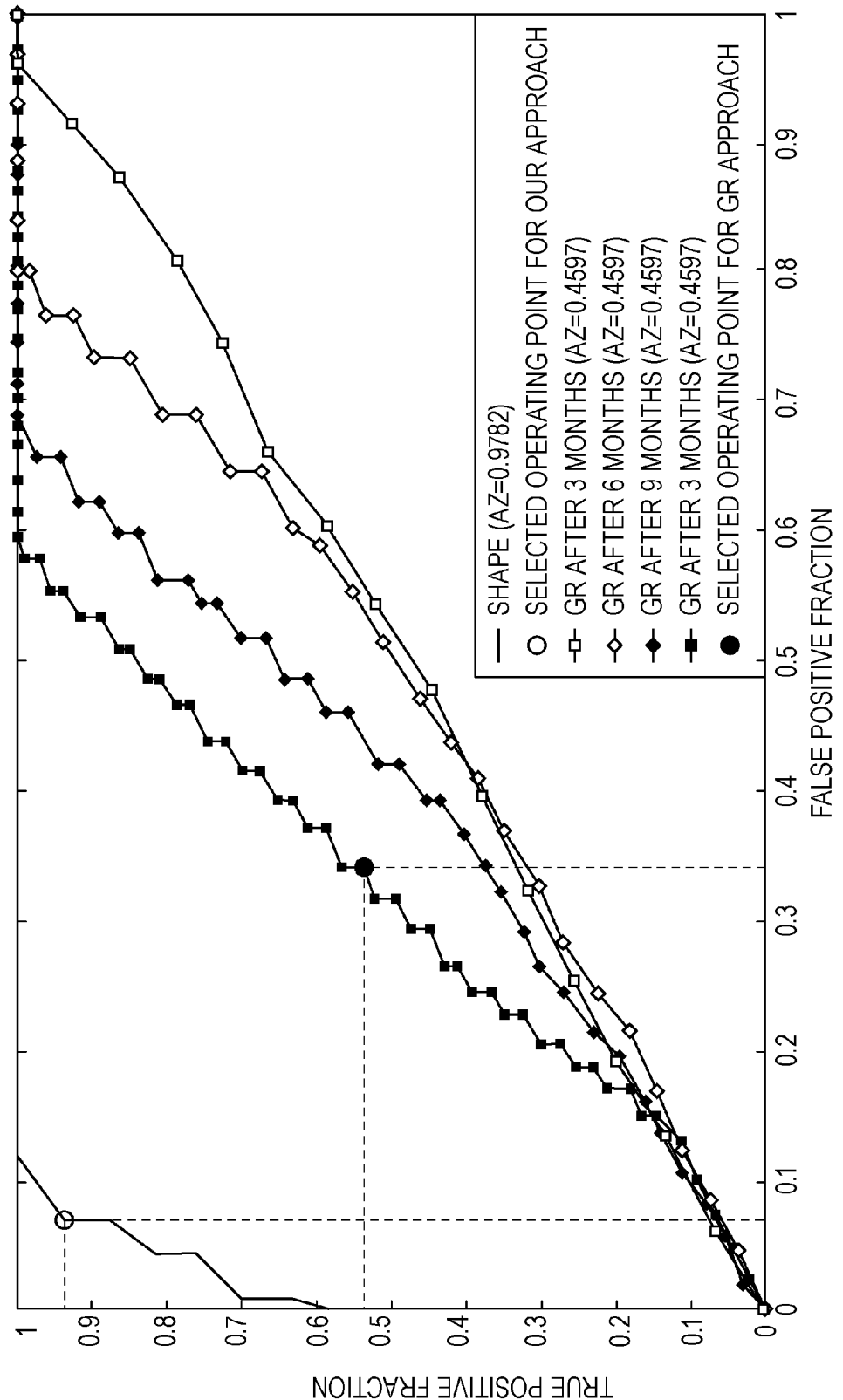
FIG. 9 is a graph providing a comparison of accuracy between the present invention and conventional methods in classifying pulmonary nodules.

Another way to measure and test the performance of the proposed diagnostic system is to compute the receiver operating characteristic (ROC). Each point on the graph is generated by using a different cut point (classification threshold). FIG. 9 shows the ROC of the two approaches; the proposed shape index based diagnostic approach and the growth rate based diagnostic approach. It is clear from FIG. 9 that the area under ROC curve of the present invention is larger (Az=0.9782) than the area under the ROC curve of the growth rate based diagnostic approach (Az is 0.6757 for one year estimated growth rate). The high sensitivity and specificity of the proposed approach is due to using the estimated number of spherical harmonic to approximate the 3D shape of the detected lung nodule as a new discriminatory feature which is more separable than using the estimated growth rate.

CONCLUSION

Embodiments of the invention therefore rely on using the shape of a segmented 3D nodule as a reliable diagnostic feature. In some embodiments, the shape analysis of the present invention may provide significant benefits over conventional methods, including for example, improved classification speed and accuracy. Furthermore, it is believed that the herein-described nodule shape analysis may lead in some instances to more accurate and clinically useful fast diagnostics of detected pulmonary nodules without the need for investigating their temporal development on the successive LDCT images of the same subject collected for a relatively long time. However, it will be appreciated that embodiments of the invention may also utilize growth rate in combination with the aforementioned learned appearance model in order to detect malignant pulmonary nodules.

In addition, it will be appreciated that the invention may have applicability in terms of classifying other anatomical structures, e.g., other tumors or nodules found outside of the lungs, among other anatomical structures capable of being classified as either malignant or benign. Furthermore, it will be appreciated that some embodiments of the invention may classify a nodule as benign or malignant by performing shape analysis using variables other than spherical harmonics, including for example any other variables that may be indexed to describe a shape of a three dimensional model of the nodule.

Other modifications will be apparent to one of ordinary skill in the art. Therefore, the invention lies in the claims hereinafter appended.

What is claimed is:

1. A method for classifying an anatomical structure, the method comprising:
    processing image data including image data associated with an anatomical structure to generate segmented image data for the anatomical structure;
    generating a three dimensional (3D) model of the anatomical structure based on the segmented image data;
    using at least one processor, performing spherical harmonic shape analysis of the 3D model, including mapping the 3D model to a unit sphere and thereafter computing a number of spherical harmonics required to delineate the unit sphere to the 3D model; and
    classifying the anatomical structure based on the spherical harmonic shape analysis of the 3D model.

2. The method of claim 1, wherein the anatomical structure is a nodule, and wherein performing shape analysis classifies the nodule as malignant or benign.

3. The method of claim 2, wherein the nodule is a pulmonary nodule, and wherein the image data comprises a low dose computed tomography (LDCT) chest scan.

4. The method of claim 3, wherein processing the image data includes segmenting image data associated with lung tissue from image data associated with the chest scan.

5. The method of claim 4, wherein processing the image data further comprises equalizing the segmented image data associated with the lung tissue.

6. The method of claim 5, wherein processing the image data further comprises segmenting image data associated with a pulmonary nodule from the equalized and segmented image data associated with the lung tissue.

7. The method of claim 1, wherein mapping the 3D model to the unit sphere includes modifying positions of a plurality of nodes in the 3D model such that each node is a substantially determined unit distance from a center of the anatomic structure and each node is a substantially equal distance from each neighboring node.

8. The method of claim 1, wherein the 3D model comprises a 3D mesh model of a surface of the anatomical structure.

9. The method of claim 1, wherein the anatomical structure comprises a nodule, and wherein classifying the anatomical structure includes classifying the nodule as malignant or benign based upon the number of spherical harmonics required to delineate the unit sphere to the 3D model.

10. The method of claim 9, wherein classifying the nodule as malignant or benign uses a learned shape model.

11. The method of claim 1, wherein computing the number of spherical harmonics includes approximating the 3D model by the unit sphere and a linear combination of spherical harmonics.

12. The method of claim 1, further comprising determining an error value between the delineated unit sphere and the 3D model for each spherical harmonic, wherein classifying the anatomic structure nodule is based at least in part on the determined error value for each spherical harmonic.

13. A method for classifying an anatomical structure comprising a nodule, the method comprising:
   processing image data including image data associated with a nodule to generate segmented image data for the nodule;
   generating a three dimensional (3D) model of the nodule based on the segmented image data;
   using at least one processor, performing spherical harmonic shape analysis of the 3D model, including computing a number of spherical harmonics required to delineate the unit sphere to the 3D model; and
   classifying the nodule as malignant or benign based upon the number of spherical harmonics required to delineate the unit sphere to the 3D model.

14. The method of claim 13, wherein classifying the nodule as malignant or benign uses a learned shape model.

15. A method for classifying an anatomical structure, the method comprising:
   processing image data including image data associated with an anatomical structure to generate segmented image data for the anatomical structure;
   generating a three dimensional (3D) model of the anatomical structure based on the segmented image data;
   using at least one processor, performing spherical harmonic shape analysis of the 3D model, including computing a number of spherical harmonics required to delineate the unit sphere to the 3D model, wherein computing the number of spherical harmonics includes approximating the 3D model by the unit sphere and a linear combination of spherical harmonics; and
   classifying the anatomical structure based on the spherical harmonic shape analysis of the 3D model.

16. A method for classifying an anatomical structure, the method comprising:
   processing image data including image data associated with an anatomical structure to generate segmented image data for the anatomical structure;
   generating a three dimensional (3D) model of the anatomical structure based on the segmented image data;
   using at least one processor, performing spherical harmonic shape analysis of the 3D model, including computing a number of spherical harmonics required to delineate the unit sphere to the 3D model;
   determining an error value between the delineated unit sphere and the 3D model for each spherical harmonic; and
   classifying the anatomical structure based on the spherical harmonic shape analysis of the 3D model and based at least in part on the determined error value for each spherical harmonic.

17. An apparatus, comprising:
   at least one processor; and
   program code configured upon execution by the at least one processor to classify an anatomical structure by:
      processing image data including image data associated with an anatomical structure to generate segmented image data for the anatomical structure;
      generating a three dimensional (3D) model of the anatomical structure based on the segmented image data;
      performing spherical harmonic shape analysis of the 3D model, including mapping the 3D model to a unit sphere and thereafter computing a number of spherical harmonics required to delineate the unit sphere to the 3D model; and
      classifying the anatomical structure based on the spherical harmonic shape analysis of the 3D model.

18. A program product, comprising:
   a non-transitory computer readable medium; and
   program code stored on the non-transitory computer readable medium and configured upon execution by at least one processor to classify an anatomical structure by:
      processing image data including image data associated with an anatomical structure to generate segmented image data for the anatomical structure;
      generating a three dimensional (3D) model of the anatomical structure based on the segmented image data;
      performing spherical harmonic shape analysis of the 3D model, including mapping the 3D model to a unit sphere and thereafter computing a number of spherical harmonics required to delineate the unit sphere to the 3D model; and
      classifying the anatomical structure based on the spherical harmonic shape analysis of the 3D model.

19. A method for classifying an anatomical structure, the method comprising:
   processing image data including image data associated with an anatomical structure to generate segmented image data for the anatomical structure;
   generating a three dimensional (3D) model of the anatomical structure based on the segmented image data;
   using at least one processor, performing spherical harmonic shape analysis of the 3D model, including computing a number of spherical harmonics required to delineate the unit sphere to the 3D model; and
   classifying the anatomical structure as malignant or benign based upon the number of spherical harmonics required to delineate the unit sphere to the 3D model.

20. The method of claim 19, wherein classifying the anatomical structure as malignant or benign uses a learned shape model.

* * * * *